(12) United States Patent
Sun et al.

(10) Patent No.: US 11,307,015 B2
(45) Date of Patent: Apr. 19, 2022

(54) METHOD FOR CALCULATING ECCENTRICITY OF ROTOR ASSEMBLY AXIS BASED ON RADIAL RUNOUT MEASUREMENT

(71) Applicant: DALIAN UNIVERSITY OF TECHNOLOGY, Dalian (CN)

(72) Inventors: Qingchao Sun, Dalian (CN); Xin Liu, Dalian (CN); Yichao Gao, Dalian (CN); Yunlong Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 224 days.

(21) Appl. No.: 16/604,037

(22) PCT Filed: Sep. 12, 2018

(86) PCT No.: PCT/CN2018/105196
§ 371 (c)(1),
(2) Date: Oct. 9, 2019

(87) PCT Pub. No.: WO2020/051794
PCT Pub. Date: Mar. 19, 2020

(65) Prior Publication Data
US 2020/0309502 A1    Oct. 1, 2020

(51) Int. Cl.
*G01B 5/20* (2006.01)
(52) U.S. Cl.
CPC .................................. *G01B 5/201* (2013.01)
(58) Field of Classification Search
CPC ..................................................... G01B 5/201
See application file for complete search history.

(56) References Cited

U.S. PATENT DOCUMENTS

| | | | |
|---|---|---|---|
| 9,573,198 B1* | 2/2017 | Favilla | B23B 49/023 |
| 2014/0005978 A1* | 1/2014 | Shimizu | G01B 21/20 |
| | | | 702/167 |

FOREIGN PATENT DOCUMENTS

| | | |
|---|---|---|
| CN | 101556145 A | 10/2009 |
| CN | 102426615 A | 4/2012 |
| CN | 103776365 A | 5/2014 |
| CN | 105627969 A | 6/2016 |
| WO | WO 02/097961 A1 | 12/2002 |

\* cited by examiner

*Primary Examiner* — Eman A Alkafawi
(74) *Attorney, Agent, or Firm* — Muncy, Geissler, Olds and Lowe, P.C.

(57) ABSTRACT

A method for calculating eccentricity of rotor assembly axis based on radial runout measurement comprises matrix characterization of data and calculation of relative runout value at each point, establishment of a spring equivalent model and calculation of contact force, eccentric direction and magnitude; calculation of relative runout value; establishment of a spring equivalent model to analyze the relationship between force and displacement in each phase of a contact process, and then an uneven contact force at each point is obtained; and determination of eccentricity is to determine the magnitude of eccentricity. Based on the measured radial runout data in production practice, this method realizes the prediction of eccentricity of axis before assembly, improves the coaxiality of rotors after assembly, and has important practical guiding significance for axis prediction as well as assembly phase adjustment and optimization in the assembly process of aero-engine rotor pieces.

1 Claim, 3 Drawing Sheets

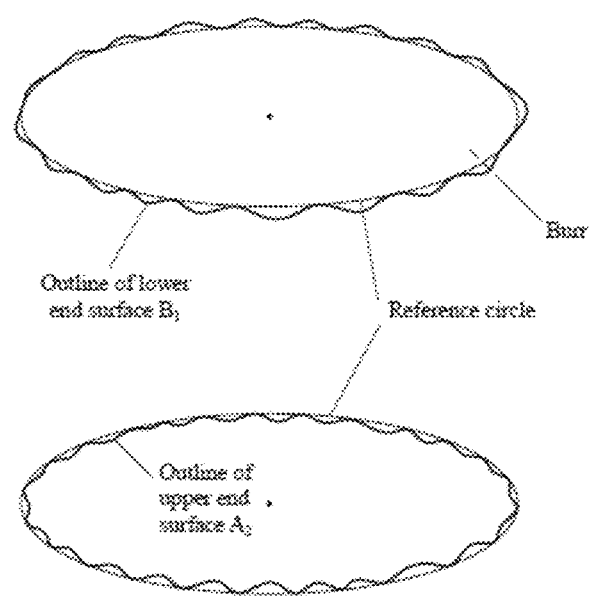
Fig.1(Fig.1 as an illustration in Abstract)
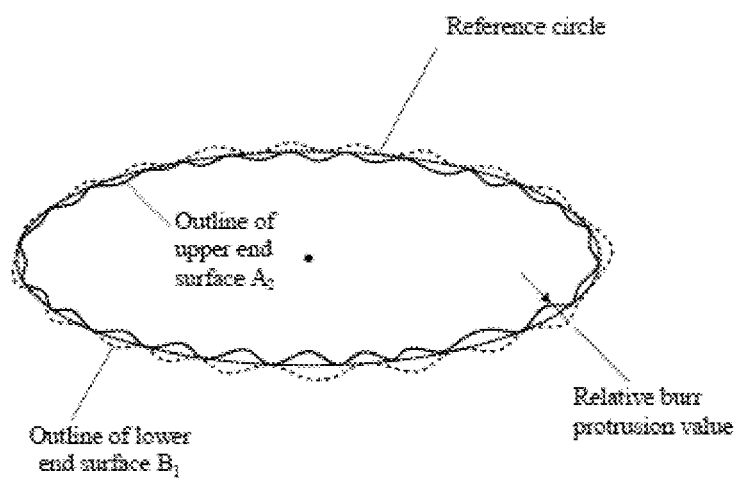
Fig.2

METHOD FOR CALCULATING ECCENTRICITY OF ROTOR ASSEMBLY AXIS BASED ON RADIAL RUNOUT MEASUREMENT

TECHNICAL FIELD

The present invention belongs to a method for calculating eccentricity of rotor assembly axis, and can be applied to axis prediction, assembly phase optimization and assembly guidance in the assembly process of important parts such as aero-engine high pressure compressor rotor, high pressure turbine disk and low pressure rotor.

BACKGROUND

As a very important link in equipment manufacturing process, assembly has a direct impact on the performance and reliability of a product. For an aero-engine rotor assembly, it is important to ensure that the concentricity after assembly meets requirements. The researchers studied "Yang Z, McWilliam S, Popov A A, et al. A probabilistic approach to variation propagation control for straight build in mechanical assembly", the concentricity optimization method of aero-engine rotor assembly based on the tolerance characterization method and the homogeneous transformation matrix, which improved the rotor assembly quality, the disadvantage is that the rotor is only regarded as a rigid body, and the interference condition of the rotor assembly spigot is not considered, which is slightly different from the actual situation. The invention combines actual measured runout data to construct a rotor concentricity control method based on elastic deformation, which is closer to the actual assembly situation, and therefore has a wide range of engineering significance. All stage rotors rely on spigot fit for positioning, and spigot fit belongs to interference fit. The eccentricity of axis generated among all stage disks after assembly is mainly due to the uneven morphology of spigot joint before assembly, resulting in uneven radial forces around each spigot after assembly. Therefore, in combination with the actual assembly process in a factory, and on the basis of considering the elastic deformation of interference assembly of spigots, it is crucial to find the relationship between the morphology of the spigot joint before assembly and the eccentricity of axis generated after assembly of each stage disk.

Determining eccentricity of rotor assembly axis is an important step applied in assembly phase prediction and optimization. Fitting circle method is a method for calculating the eccentricity of assembly axis by least square fitting based on the radial runout data of a measured spigot joint through a radial runout fitting circle of inside and outside spigots of two rotor pieces. This algorithm is simple in procedure and can grasp the morphological characteristics of spigot joint surfaces as a whole. However, since the fitting circle obtained by least squares cannot fully reflect the amplitude characteristics of the initial morphology, the error between the fitting circle and the initial morphology circle is irregular, so the accuracy of the predicted eccentricity of axis is difficult to be guaranteed. Actual rotary centerline method is a method for predicting eccentricity of axis adopted by Axiam, and the essence thereof is to explore the actual rotary axis generated after assembly by measuring the runout data at the spigots of all stage disks, and carrying out assembly phase adjustment and optimization based on this axis. This method is mainly applied in foreign countries, and the key technology has not been introduced into China. This method has a high prediction accuracy, but restricted by the part and component manufacturing level in China, the phenomenon of part out-of-tolerance is widespread. There is no basic aligning and tilt adjusting process for a roundness meter in the application process of this method, so it is difficult to adapt to the production and assembly process of aero-engine rotors in China.

The present invention proposes, a method for calculating eccentricity of axis after assembly based on the measurement of radial runout before the assembly of rotor connection spigots and in consideration of normal elastic deformation. This method can be used for realizing the prediction of eccentricity of axis for each stage disk at a certain assembly phase, and then further realizing the optimization and adjustment of the assembly phase, which has important practical significance.

SUMMARY

In order to meet the coaxiality requirements in the assembly process of aero-engine rotor pieces, the present invention proposes a calculation method for calculating the eccentricity of assembly among all stages in combination with engineering practice and based on the measured radial runout data at a spigot joint of each stage disk of the rotor pieces.

The calculation principle of this method is as follows:

On the premise of considering a certain installation phase in the assembly of two stage disks, take into account the elastoplastic deformation at a spigot during assembly process, and calculate the relationship between radial runout and eccentricity at the spigot joint. Due to the uneven radial runout at each circumferential position of the spigot joint, the actual assembly interference amount is uneven, and the deformation caused by assembly is uneven. The relationship between the uneven deformation and the eccentricity after assembly is found by this method, i.e., the relationship between the measured radial runout data and the eccentricity of the assembly axis car be obtained.

Since spigot fit belongs to interference fit, it is not applicable to rigidity assumption. In this method, the deformation caused by interference assembly at the spigot joint is considered, the impact of uneven assembly deformation caused by uneven spigot morphology on assembly eccentricity is explored, and the eccentricity is determined in a spring equivalent mode, i.e., each set of contact points are equivalent to two spring contacts, the state that the two centers of circle of the upper end surface $A_2$ and the lower end surface $B_1$ coincides with each other is the initial state, the elastic force generated by a pair of contact points with a large deformation amount is large, and therefore the elastic forces generated by the contact points at different positions are different. Vector summation of all elastic forces is carried out to obtain the direction of the vector resultant force; since the lower end surface $B_1$ of the upper end piece B will move in this direction based on the actual fit condition, if the vector sum of all elastic forces is 0 after the lower end surface moves by a distance e, the center of circle position of the lower end surface $B_1$ at this moment is the actual fit position, and the moving distance is the eccentricity e.

In this method, a roundness meter is used for measuring the radial runout at the spigot of each stage flange first, then the radial runout data at the spigot of every two adjacent stage disks is used as an input parameter, and a relative eccentric matrix of two adjacent stage disks after assembly is obtained through calculation by this algorithm. By multiplying the eccentric matrices of every two adjacent stage disks, a total eccentric matrix reflecting the concentricity of an assembly of multiple stage disks can be obtained. It should be pointed out that adjusting different assembly phases will result in different eccentric matrices, but the number of assembly phases of two adjacent stage disks is limited due to the restriction of bolt holes, positioning holes and the like. When the total eccentric matrix calculated by this method is used as an evaluation parameter, an optimal assembly phase can be found before assembly to greatly reduce the number of repeated disassembly and assembly and improve the one-time acceptance rate of assembly.

DESCRIPTION OF DRAWINGS

FIG. 1 is a schematic diagram of joint surfaces of two rotors;

FIG. 2 is a schematic diagram of a relative burr protrusion value;

In FIG. 6, e is the eccentricity, O is the initial center of circle, $O_2$ is the center of an eccentric circle, r is the radius of the reference circle of the rotors, d is the displacement of a measuring point, θ is the eccentric angle, $δ_2$ is the angle corresponding to the measuring point, and γ is the angle corresponding to a triangle.

DETAILED DESCRIPTION

Specific calculation mode of this method is further described below in combination with accompanying drawings and the technical solution.

Embodiment

Figure 3:
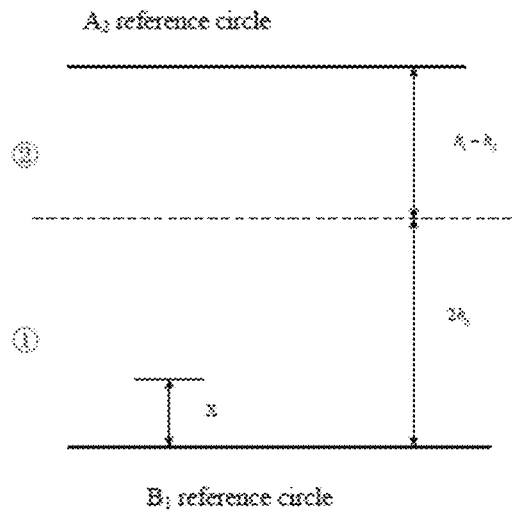
FIG. 3 is a schematic diagram of fit state of rotors.
Figure 4:
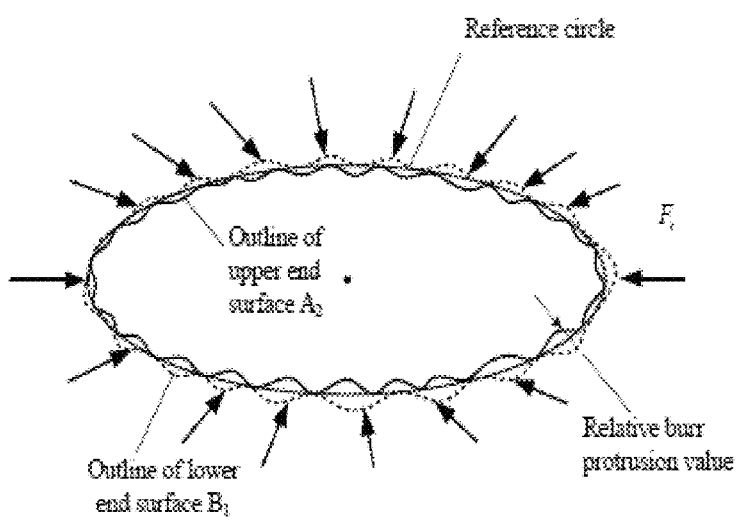
FIG. 4 is a schematic diagram of elastic forces in an ideal state.

A method for calculating eccentricity of rotor assembly axis based on radial runout measurement, comprising the following steps:

Step A: for two adjacent stage disks, positioning the joint of a lower stage rotor A and an upper stage rotor B by spigot interference fit, then the centers of surfaces from the bottom up are respectively $A_{O1}$, $A_{O2}$, $B_{O1}$, $B_{O2}$, $A_{O1}$, $A_{O2}$, $B_{O1}$, $B_{O2}$, $A_{O1}$, $A_{O2}$, $B_{O1}$, $B_{O2}$ and $A_{O1}$, $A_{O2}$, $B_{O1}$, $B_{O2}$; accessing the measured radial runout values of the spigot joint surfaces of the two rotors and characterizing the values by a matrix, with the data in the form of a circle, then the radial runout data of a lower end surface of an upper end piece B is expressed as: $B_{O1}(α,z_{b1})$, and the radial runout data of an upper end surface of an lower end piece A is expressed as: $A_{O2}(α,z_{a2})$; using a polar coordinate representation method for characterization; the position of the center of circle O in a global coordinate system is O(0,0), and the fit spigot radius R is given;

Step B: calculating the relative runout value at each point. As shown in FIG. 1, the upper end surface and the lower end surface are in an interference fit state; the shown "burr" means that in a part manufacturing process, due to the existence of a machining error, the actual diameter of a rotor at a fit spigot is randomly generated within the range of the machining error, i.e., the radius value of each point relative to an ideal center of circle is also randomly generated, and the burr value is the distance of each point relative to a reference circle;

Step C: as shown in FIG. 2, due to the existence of spigot interference amount, uneven elastic forces directing to the center of circle will be generated around spigots when the two rotors are assembled; in order to calculate the elastic force at each measuring point, the relative burr protrusion value at each point needs to be calculated; the rigidity of the burr is negligible compared with the reference circle, and the relative position of the center of the reference circle is temporarily assumed to be unchanged in the assembly process; the burr portion is equivalent to a spring, assuming that the burr rigidity function is $k_1(n)$, where n is the burr width; the reference circle rigidity is $k_2(y)$, where y is the distance from the surface of the reference circle; as shown in FIG. 3, $h_1$ is the burr value of $B_1$ at a certain point, $h_2$ is the burr value of $A_2$ at a certain point; if $h_2 > h_1$, x represents a displacement distance, and ① represents the first phase: two springs are compressed at the same time; ② represents the second phase: $h_1$ spring is compressed; ③ represents the third phase: reference circle compression phase; F represents the suffered elastic force; the relationship between force and displacement in each phase is as follows:

In the first phase:

$$F = k_1(n)\frac{x}{2} \quad (1)$$

In the second phase:

$$F = k_1(n)h_2 + k_1(n)(x - 2h_2) \quad (2)$$

In the third phase:

$$F = k_2(y)(x - h_1 - h_2) + k_1(n)h_2 + k_1(n)(h_1 - h_2) \quad (3)$$

If $h_2 < h_1$, it can be obtained in a similar way that:

In the first phase:

$$F = k_1(n)\frac{x}{2} \quad (4)$$

In the second phase:

$$F = k_1(n)h_1 + k_1(n)(x - 2h_1) \quad (5)$$

In the third phase:

$$F = k_2(y)(x - h_1 - h_2) + k_1(n)h_1 + k_1(n)(h_2 - h_1) \quad (6)$$

Figure 5:
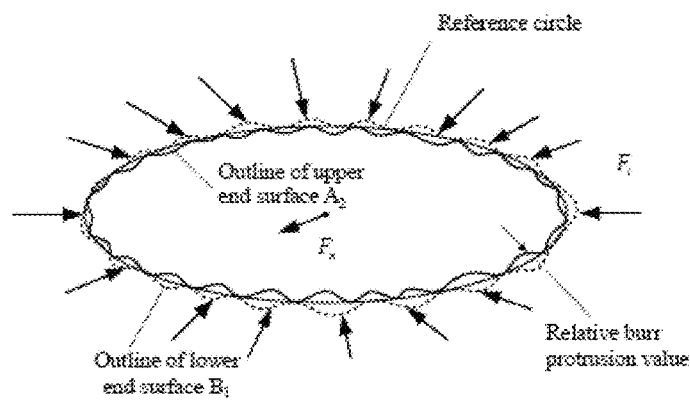
FIG. 5 is a schematic diagram of resultant force in an ideal state.
Figure 6:
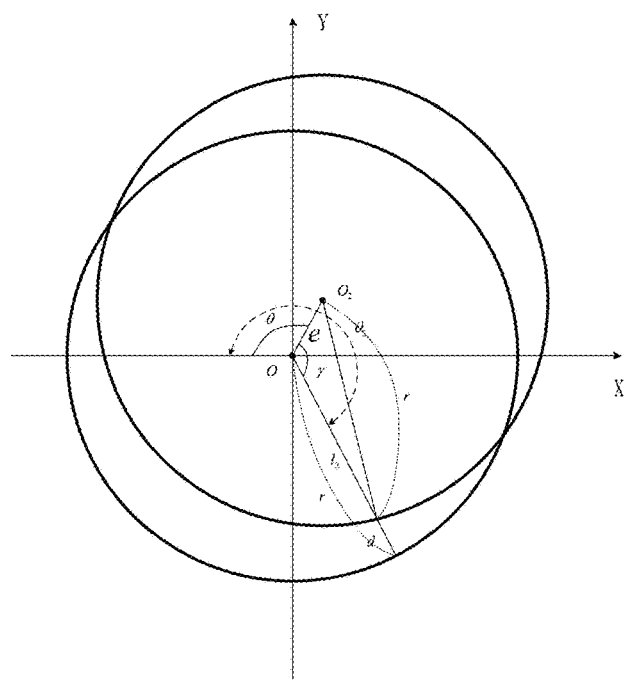
FIG. 6 is a schematic diagram of relationship between displacement and eccentricity at each point.

Step D: calculating the contact force at each point in an ideal state. Considering the contact surfaces of both spigots of the rotor A and the rotor B as springs, the uneven radial runout values of the two spigots are equivalent to uneven elastic forces, and the solid portion of a base body is regarded as a rigid body without deformation. As shown in FIG. 5, calculating the elastic force at each point in the case where the centers of the two joint surfaces coincides with each other in the ideal state first according to formulas (1) to (6), where i represents the number of measuring points;

The formulas are the same as formulas (1) to (6);

Step E: calculating resultant force vector: as shown in FIG. 6, combining the spring force of each measuring point at the center of circle, and obtaining a resultant force $F_n$;

$$F_n = \Sigma_1^n F_i \quad (7)$$

Step F: calculating eccentricity e. The offset direction of the actual centroid relative to the center of circle, i.e., the direction of eccentricity is the direction of the resultant force $F_n$; when the relative positions of the centers of circle of the two rotors are moved in $F_n$ direction, the contact portions of each pair of measuring points will be changed, and the elastic force of each measuring point is changed until the force is balanced and an equilibrium state is achieved; the centroid offset amount and eccentric angle are calculated according to this principle;

Since the center of circle is moved by a certain distance, the displacement distance of each point is different; as shown in FIG. 6, e is the eccentricity, O is the initial center of circle, $O_2$ is the center of an eccentric circle, r is the radius of the reference circle of the rotors, d is the displacement of a measuring point, θ is the eccentric angle, $θ_2$ is the angle corresponding to the measuring point, and γ is the angle corresponding to a triangle.

It can be obtained according to the geometrical relationship that:

$$\begin{cases} r^2 = e^2 + l_2^2 - 2el_2 \cos\gamma \\ d = r - l_2 \end{cases} \quad (8)$$

Figure 7:
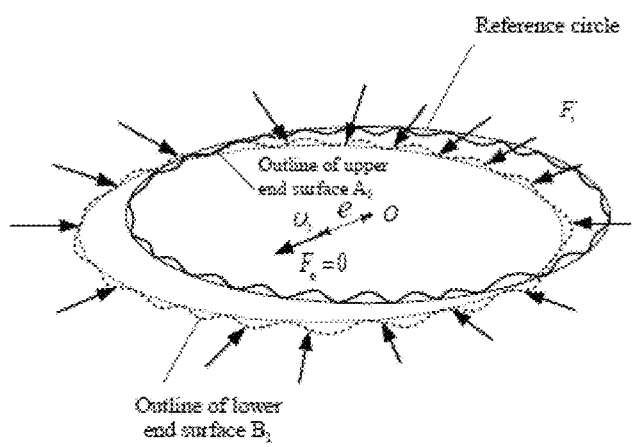
FIG. 7 is a schematic diagram of an equilibrium state.

The relationship between eccentricity and the displacement of the measuring point is obtained from formula (8), and as shown in FIG. 7, the resultant force is obtained by vector force combination at the center of circle; when the equilibrium state is reached, it can be obtained that:

$$\begin{cases} F_i' = F_i \pi(d) \\ F_n = \sum_1^n F_i' \\ F_n = 0 \end{cases} \quad (9)$$

The eccentricity e can be obtained by solving formula (9).

The invention claimed is:

1. A method for calculating eccentricity of rotor assembly axis based on radial runout measurement, wherein comprising the following steps:

step A, for two adjacent stage disks, positioning the joint of a lower stage rotor A and an upper stage rotor B by a spigot interference fit, then the centers of surfaces from the bottom up are respectively $A_{O1}$, $A_{O2}$, $B_{O1}$, $B_{O2}$; accessing the measured radial runout values of the spigot joint surfaces of the two rotors and characterizing the values by a matrix, with the data in the form of a circle, using a polar coordinate representation method for characterization, then the radial runout data of a lower end surface of an upper end piece B is expressed as: $B_{O1}(\alpha, z_{b1})$, and the radial runout data of an upper end surface of a lower end piece A is expressed as: $A_{O2}(\alpha, z_{a2})$; α refers to the measurement angle, $Z_{b1}$ and $Z_{a2}$ refer to the radial runout value when the measurement angle is α; a coordinate of a reference circle center is O(0,0), and the fit spigot radius R is given, R is the radius of the reference circle;

step B, calculating the relative runout value at each point of the upper end surface and the lower end surface are in an interference fit state; the formed "burr" means that in a part manufacturing process, due to the existence of a machining error, the actual diameter of a rotor at a fit spigot is randomly generated within the range of the machining error, wherein the radius value of each point relative to center of the reference circle is also randomly generated, and the burr dimension is the distance of each point relative to the reference circle;

step C, due to the existence of spigots interference amount, uneven elastic forces directing to the center of the reference circle are generated around both spigots of the rotor A and the rotor B when the two rotors are assembled; in order to calculate the elastic force at each measuring point, the burr dimension at each measuring point needs to be calculated; the rigidity of the burr is negligible compared with the reference circle, and the relative position of the center of the reference circle is temporarily assumed to be unchanged in the assembly process; a force caused the burr portion is equivalent to a elastic force of a spring, assuming that the burr rigidity function is $k_1(n)$, where n is the burr width; the reference circle rigidity is $k_2(y)$, where y is the distance from the surface of the reference circle; $h_1$ is the burr dimension of $B_1$ at one point, $h_2$ is the burr dimension of $A_2$ at another point; if $h_2 > h_1$, x represents a displacement distance, and ① represents the first phase of two springs being compressed at the same time; ② represents the second phase of $h_1$ spring being compressed; ③ represents the third phase of the reference circle compression phase; F represents the suffered elastic force; the relationship between force and displacement in each phase is as follows:

in the first phase:

$$F = k_1(n)\frac{x}{2} \quad (1)$$

in the second phase:

$$F = k_1(n)h_2 + k_1(n)(x - 2h_2) \quad (2)$$

in the third phase:

$$F = k_2(y)(x - h_1 - h_2) + k_1(n)h_2 + k_1(n)(h_1 - h_2) \quad (3)$$

if $h_2 < h_1$, it is obtained in a similar way that:

in the first phase:

$$F = k_1(n)\frac{x}{2} \quad (4)$$

in the second phase:

$$F = k_1(n)h_1 + k_1(n)(x - 2h_1) \quad (5)$$

in the third phase:

$$F = k_2(y)(x - h_1 - h_2) + k_1(n)h_1 + k_1(n)(h_2 - h_1) \quad (6)$$

step D, calculating the contact force at each point in an ideal state, includes: considering the contact surfaces of spigot of the rotor A and spigot of the rotor B as springs, the uneven radial runout values of the two spigots are equivalent to uneven elastic forces, and the solid portion of a base body is regarded as a rigid body without deformation; calculating the elastic force at each point in the case where the centers of the two joint surfaces coincides with each other in the ideal state first according to formulas (1) to (6);

the formulas are the same as formulas (1) to (6);

step E, calculating resultant force vector, includes: combining the spring force of each measuring point at the center of the reference circle, and obtaining a resultant force $F_n$;

$$F_n = \Sigma_1^n F_i \quad (7)$$

where, i represents the number of measuring points;

step F, calculating eccentricity e: the offset direction of the actual centroid relative to the center of the reference circle, wherein, the direction of eccentricity is the direction of the resultant force $F_n$; when the relative positions of the centers of the reference circle of the two rotors are moved in $F_n$ direction, the contact portions of each pair of measuring points are changed, and the elastic force of each measuring point is changed until the force is balanced and an equilibrium state is achieved; the centroid offset amount and eccentric angle are calculated according to this principle;

since the center of the reference circle is moved by a certain distance, the displacement distance of each point is different; e is the eccentricity, O is the center of the reference circle, $O_2$ is the center of an eccentric circle, r is the radius of the reference circle of the rotors, d is the displacement of a measuring point, $\theta$ is the eccentric angle, $\theta_2$ is the angle corresponding to the measuring point, and $\gamma$ is the angle corresponding to a triangle;

it is obtained according to the geometrical relationship that:

$$\begin{cases} r^2 = e^2 + l_2^2 - 2el_2 \cos\gamma \\ d = r - l_2 \end{cases} \quad (8)$$

the relationship between eccentricity and the displacement of the measuring point is obtained from formula (8), and the resultant force is obtained by vector force combination at the center of the reference circle; when the equilibrium state is reached, it is obtained that:

$$\begin{cases} F_i' = F_i \pi(d) \\ F_n = \sum_1^n F_i' \\ F_n = 0 \end{cases} \quad (9)$$

the eccentricity e is obtained by solving formula (9).

* * * * *